T. P. Shaffner,
Blasting Cartridge.
No. 94,847. Patented Sep. 14, 1869.
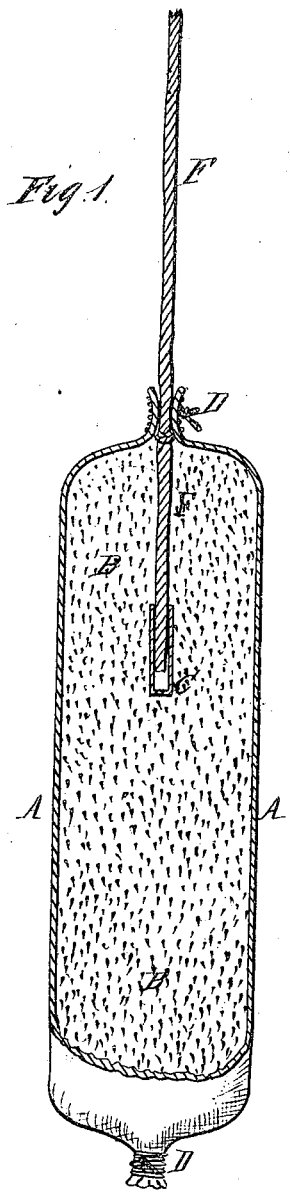
Witnesses:
James Deveau
George S. Hamlin
Inventor:
T. P. Shaffner

UNITED STATES PATENT OFFICE.

TAL. P. SHAFFNER, OF LOUISVILLE, KENTUCKY.

IMPROVED CARTRIDGE FOR ARTILLERY AND BLASTING.

Specification forming part of Letters Patent No. 94,847, dated September 14, 1869.

*To all whom it may concern:*

Be it known that I, TALIAFERRO P. SHAFFNER, of the city of Louisville, county of Jefferson, State of Kentucky, have discovered or invented a new and Improved Artillery and Blasting Cartridge, of which the following is a specification:

The nature of my invention consists in the application of animal intestines, membranous or cutaneous matter, in the form of a sack, bag, or pouch filled or charged with any explosive substance, but more particularly nitro-glycerine, or compounds formed by the use of nitro-glycerine.

In the use of the above-named substance there will be no decomposition of the nitro-glycerine, as occurs sometimes in the use of bags or cartridges made of paper or other fibrous material. Nitro glycerine does not undergo any chemical change when enveloped by a fatty substance, nor does it chemically act upon the fatty matter. The use of animal intestines for cartridges will be durable and safe envelopes for nitro-glycerine. For powder they will be water-tight, and can be used for water-blasting. If used for shells in war they will be found serviceable in keeping the powder dry; and in charging the shell with nitro-glycerine, or compounds formed in part by the use of nitro glycerine, for example, the bladder of an animal may be filled with nitro-glycerine and placed in a shell, where it can remain in a perfect condition for an unlimited time. This will be the case beyond question if a small quantity of pure water be placed with the nitro-glycerine in the bladder.

For purposes of blasting in rock or other matter I take the ordinary intestines of the animal, same as prepared for sausages, and fill them of any desired length with nitro-glycerine, or with any compound of which nitro-glycerine forms a part. They can be cut the desired lengths before being filled, or after or at the time.

Figure 1 represents a sectional view of a cartridge of the above description.

A A is the intestine bag, filled with nitro-glycerine, B B, mixed or unmixed with other matter. F F is a blasting-fuse, with the percussion-cap C attached to the lower end. The cartridge-casing is tied at D D with any ordinary string; or the parts may be in other ways united—for example, by plug or cork. The fuse carries the fire to the percussion-cap, and the explosion of the cap explodes the gunpowder, nitro-glycerine, or other explosive in substance in the bag A A. Ordinary gunpowder may be ignited by a spark, however, and the percussion-cap need not be used.

I am aware that gut or bladder has been used for covering cartridges for small-arms, &c., by cutting and enveloping the powder-casing, the object being to keep the cartridge dry; but the objects attained by the use and application of intestines for nitro-glycerine cartridges are entirely different, as hereinbefore described.

Having now fully described the nature of my discovery or invention sufficiently full and distinct to enable those skilled in the arts to which it belongs to make and use the same, what I claim, and desire to secure by Letters Patent, as my discovery or invention, is—

The application of intestine membranous or cutaneous matter for sacks or bags to be used as artillery or blasting cartridges, substantially in the manner and for the purposes hereinbefore described.

TAL. P. SHAFFNER.

Witnesses:
 JAMES DEVEAU,
 GEORGE S. HAMLIN.